(12) United States Patent
Wodetzki et al.

(10) Patent No.: US 9,023,178 B2
(45) Date of Patent: May 5, 2015

(54) PELLET COMPRISING ARAMID PULP AND FILLER MATERIAL

(71) Applicant: Teijin Aramid GmbH, Wuppertal (DE)

(72) Inventors: Andreas Paul Benno Wodetzki, Sprockhövel (DE); Ben Gerhardus Antonius Rolink, Ugchelen (NL); Mikael Vertommen, Arnhem (NL); Rudy Mathias Henricus Heijmans, Arnhem (NL)

(73) Assignee: Teijin Aramid GmbH, Wuppertal (DE)

( * ) Notice: Subject to any disclaimer, the term of this patent is extended or adjusted under 35 U.S.C. 154(b) by 0 days.

(21) Appl. No.: 14/355,662

(22) PCT Filed: Nov. 7, 2012

(86) PCT No.: PCT/EP2012/072014
§ 371 (c)(1),
(2) Date: May 1, 2014

(87) PCT Pub. No.: WO2013/068390
PCT Pub. Date: May 16, 2013

(65) Prior Publication Data
US 2014/0299285 A1  Oct. 9, 2014

(30) Foreign Application Priority Data
Nov. 7, 2011 (EP) .................... 11188011

(51) Int. Cl.
*D21H 13/26* (2006.01)
*D21H 13/36* (2006.01)
*D21H 13/44* (2006.01)
*D21H 13/46* (2006.01)
*D21H 13/50* (2006.01)
*C04B 18/02* (2006.01)
*C04B 20/10* (2006.01)

(52) U.S. Cl.
CPC ............... *D21H 13/26* (2013.01); *D21H 13/36* (2013.01); *D21H 13/44* (2013.01); *D21H 13/46* (2013.01); *D21H 13/50* (2013.01); *C04B 18/028* (2013.01); *C04B 20/10* (2013.01)

(58) Field of Classification Search
None
See application file for complete search history.

(56) References Cited

U.S. PATENT DOCUMENTS

| | | | | |
|---|---|---|---|---|
| 5,639,807 A | * | 6/1997 | Secrist et al. | .............. 523/215 |
| 6,068,922 A | * | 5/2000 | Vercesi et al. | .............. 428/402 |
| 2004/0043217 A1 | | 3/2004 | Dezutter et al. | |
| 2008/0259724 A1 | * | 10/2008 | Mowka et al. | .............. 366/276 |
| 2010/0310868 A1 | | 12/2010 | Schmitt et al. | |

FOREIGN PATENT DOCUMENTS

| | | |
|---|---|---|
| CN | 102 167 869 A | 8/2011 |
| DE | 102004027239 A1 | 12/2005 |
| WO | WO 93/04300 A | 3/1993 |
| WO | WO 2005/118123 A1 | 12/2005 |

OTHER PUBLICATIONS

CN 102 167 869 A, machine translation, China, Aug. 31, 2011.*
Jan. 30, 2013 International Search Report and Written Opinion issued in PCT Application No. PCT/EP2012/072014.
Nov. 15, 2013 International Preliminary Report on Patentability issued in PCT Application No. PCT/EP2012/072014.

* cited by examiner

*Primary Examiner* — Mark Halpern
(74) *Attorney, Agent, or Firm* — Oliff PLC

(57) ABSTRACT

A pellet made of aramid pulp and filler material. The pellet has at most 90 weight percent aramid pulp and at least 10 weight percent filler material. A method for manufacturing a pellet that has at most 90 weight percent aramid pulp and at least 10 weight percent filler material.

17 Claims, No Drawings

PELLET COMPRISING ARAMID PULP AND FILLER MATERIAL

This application is a 371 of PCT/EP2012/072014 filed 7 Nov. 2012

BACKGROUND

The invention pertains to a pellet comprising aramid pulp and filler material.

Pellets made from pulp and an additional material are known in the prior art. In document US 2004/0043217 pulp is blended with adjuvants whereby for the blending process a liquid is used. The amount of adjuvants in the obtained pellet is small and no aramid is mentioned in this document. Document DE10 2004 027 239 describes a method for granulating. In this method also a liquid is used.

The disadvantage of the prior art is that the pellet contains small amounts of filler material and due to the use of a liquid in the manufacturing process, the pellet is hard to break up in a further process step.

It is therefore the aim of the invention to provide a pellet, which is easily decomposable in its separate components in further processing steps.

SUMMARY

The aim is achieved by a pellet with the features of claim 1.

The aim is also achieved by a pellet consisting of aramid pulp, filler material and moisture, wherein the pellet comprises at most 90 wt % aramid pulp and at least 10 wt % filler material.

Due to the high amount of filler material in respect to the amount of aramid pulp the fibrils of the pulp are split up and the pulp of the pellet can easily break up in further processing steps than in prior art pellets.

DETAILED DESCRIPTION OF THE EMBODIMENTS

Preferably, the pellet comprises at most 80 wt % aramid pulp and at least 20 wt % filler material. Also preferred the pellet comprises at most 70 wt % aramid pulp and at least 30 wt % filler material. The pellet may comprise at least 70 wt % to at most 90 wt % aramid pulp and at least 10 wt % to at most 30 wt % filler material.

Preferably, the pellet comprises 25 to 75 wt % aramid pulp and 25 to 75 wt % filler material. In another embodiment the pellet comprises 40 to 90 wt % aramid pulp and 10 to 60 wt % filler material.

If the amount of filler material is high, the aramid pulp is better split up and the pellet is easily broken up in further processing steps in comparison to a pellet with a lower concentration of filler material in the pellet.

Preferably the pellet contains less than 10 wt % moisture. In a preferred embodiment the pellet is made by aramid pulp and filler material only, this means without an additional liquid in the manufacturing process. Therefore, the pellet contains only the atmospheric moisture and no additional moisture. Preferably, the filler material as well as the aramid pulp contains less than 10 wt % moisture and due to that also the pellet contains less than 10 wt % moisture. In a preferred embodiment the pellet contains less than 8 wt % moisture, especially preferred less than 6 wt % moisture. It is clear for a person skilled in the art that the amount of moisture, the amount of aramid pulp and the amount of filler material are 100 based on the weight of the pellet. In a preferred embodiment the pulp and the filler material is dried before the pellet is produced. In this embodiment the pellet is approximately free of moisture, this means the pellet contains less than 5 wt %, especially preferred less than 2 wt % moisture. To prevent the pellet from moisture, the pellet is preferably provided with a barrier coating, thus with a moisture impermeable coating. Due to the coating of the pellet instead of a coating of the pulp and/or the filler material, the pulp properties as well as the filler material properties are not influenced by the coating.

In a preferred embodiment the filler material is barium sulfate, calcium carbonate, mica, vermiculite, alkali metal titanates, molybdenum trioxide, cashew dust, rubber dust, graphite, metal sulfides, metal oxides, metal silicates or mixtures thereof.

In a preferred embodiment the pellet has a ball form or a puck form. The ball form or the puck form has the advantage that during a transporting of the pellet the pellet is protected against damaging. This means the pellet has no corner which can break off during the transport of the pellet.

Preferably, the aramid pulp is para aramid pulp.

In a preferred embodiment the pellet has a Kaolin retention which is equal to or higher than the Kaolin retention of the aramid pulp. The Kaolin retention of the pulp is determined as described in US 2010/0310868. A mixture of 97% Kaolin (Laude SP 20) and 3% aramid pulp is prepared on a high-speed vertical mixer. 20 g of the mixture are sieved on a riddle sifter device using a 250 mesh sieve. The remaining material on the sieve given as percentage of the initial amount is determined as Kaolin retention.

For the determination of the Kaolin retention of the pellet the amount of filler material present in the pellet has to be considered. If the pellet contains an amount of x wt % of filler material based on the total weight of the pellet, the mixture of the pellets and of Kaolin is prepared from (97−3·x/100) wt % Kaolin and (3+3·x/100) wt. % pellets, which corresponds to 3 wt % pulp. This mixture is also tested as described above.

The Kaolin retention is the ability of the aramid pulp to retain Kaolin as filler material. Preferably, this ability is at least maintained by the pellet, and the Kaolin retention of the aramid pulp is not decreased by the step producing the pellet.

A further object of the invention is a method for producing a pellet.

In the method for producing a pellet at most 90 wt % aramid pulp is mixed with at least 10 wt % filler material and thereafter pressed to a pellet, whereby the moisture content of the mixture of aramid pulp and filler material is less than 10 wt % and the mixture is pressed to the pellet without the presence of a liquid. In the manufacturing process the pellet is pressed from a dry mixture of aramid pulp and filler material, whereby the moisture content of less than 10 wt % in the pellet results from the atmospheric moisture.

Preferably, the mixture of aramid pulp and filler material contains at most 80 wt % aramid pulp and at least 20 wt % filler material, more preferred 70 wt % aramid pulp and 30 wt % filler material.

In one preferred embodiment the aramid pulp and the filler material is dried, whereby the aramid pulp and the filler material is separately dried or the mixture of aramid pulp and filler material is dried. In another preferred embodiment the achieved pellet is dried. The term "dried" means, that the aramid pulp, the filler material, the mixture of aramid pulp and filler material or the achieved pellet contains less than 5 wt % moisture, more preferred less than 2 wt % moisture.

Preferably, a barrier coating is applied on the achieved pellet. The barrier coating protects the pellet from moisture.

Preferably, a pressure of at least 2 bar and at most 7 bar, preferably at most 5 bar is used in the pressing step. Due to the low pressure during the pressing step the pellet is stiff enough for a transport of the pellet but the density of the pellet is not extremely high. Due to the low density the aramid pulp as well as the filler material after breaking up of the pellet is "fluffy".

Preferably, the method is carried out at a temperature of approximately 20° C. The temperature of 20° C. relates to the normal room temperature. Advantageously, no heating energy is necessary for the pellet manufacturing process, which preserves the environment and saves production costs.

The mixing step may be carried out in a mixing machine equipped with a mixer blade and high rotating tools, also called choppers. Such a machine is available from the company Lödige in Germany. The mixing time may be in the range of 1 to 5 minutes. A pellet forming device is supplied with the mixture and pressure is applied at room temperature. After the pressing step the pellets may be additionally dried in a heating chamber at a temperature of preferably 105° C. to get rid of residual moisture. Also a barrier coating may be applied on the pellets for moisture protection.

The invention claimed is:

1. A pellet consisting of aramid pulp, filler material and moisture; wherein the pellet
   is at most 90 wt % aramid pulp, and
   is at least 10 wt % filler material.
2. The pellet according to claim 1, wherein the pellet is at most 80 wt % aramid pulp and at least 20 wt % filler material.
3. The pellet according to claim 1, wherein the pellet is at most 70 wt % aramid pulp and at least 30 wt % filler material.
4. The pellet according to claim 1, wherein the pellet is 25 to 75 wt % aramid pulp and 25 to 75 wt % filler material.
5. The pellet according to claim 1, wherein the pellet is 40 to 90 wt % aramid pulp and 10 to 60 wt % filler material.
6. The pellet according to claim 1, wherein the pellet contains less than 10 wt % moisture.
7. The pellet according to claim 1, wherein the aramid pulp is para-aramid pulp.
8. The pellet according to claim 1, wherein the filler material is selected from the group consisting of barium sulfate, calcium carbonate, mica, vermiculite, alkali metal titanates, molybdenum trioxide, cashew dust, rubber dust, graphite, metal sulfides, metal oxides, metal silicates and mixtures thereof.
9. The pellet according to claim 1, wherein the pellet has a form selected from the group consisting of a ball and a puck.
10. A coated pellet including the pellet according to claim 1, wherein a barrier coating is provided on the pellet.
11. The pellet according to claim 1, wherein the pellet has a Kaolin retention which is equal to or higher than the Kaolin retention of the aramid pulp.
12. The pellet according to claim 1, wherein the pellet contains only the atmospheric moisture and no additional moisture.
13. A method for producing a pellet, the pellet consisting of aramid pulp, filler material and moisture, the method comprising:
    mixing at most 90 wt % aramid pulp with at least 10 wt % filler material to form a mixture, and
    pressing the mixture of aramid pulp and filler material into a pellet, wherein the moisture content of the mixture of aramid pulp and filler material is less than 10 wt % and the mixture is pressed to the pellet without the presence of a liquid.
14. The method according to claim 13, wherein a pressure of at least 2 bar and of at most 7 bar is used.
15. The method according to claim 13, wherein the method is carried out at a temperature of approximately 20° C.
16. The method according to claim 13, wherein a barrier coating is applied on the pellet.
17. The method according to claim 13, wherein the pellet contains only the atmospheric moisture and no additional moisture.

* * * * *